US012074399B2

(12) United States Patent
Bishop et al.

(10) Patent No.: US 12,074,399 B2
(45) Date of Patent: Aug. 27, 2024

(54) BATTERY CHARGING CABLE ASSEMBLY

(71) Applicant: Pale Blue Earth Inc, Park City, UT (US)

(72) Inventors: Thomas Bishop, Park City, UT (US); Stephen Warren, Park City, UT (US)

( * ) Notice: Subject to any disclaimer, the term of this patent is extended or adjusted under 35 U.S.C. 154(b) by 382 days.

(21) Appl. No.: 17/680,088

(22) Filed: Feb. 24, 2022

(65) Prior Publication Data

US 2023/0268701 A1 Aug. 24, 2023

(51) Int. Cl.
*H01R 31/02* (2006.01)
*H01R 13/642* (2006.01)
*H02J 7/00* (2006.01)

(52) U.S. Cl.
CPC ........... *H01R 31/02* (2013.01); *H01R 13/642* (2013.01); *H02J 7/0013* (2013.01); *H02J 7/0048* (2020.01); *C08L 2203/202* (2013.01)

(58) Field of Classification Search
CPC ... C08L 2203/202; H01R 31/02; H01R 31/06; H01R 13/642; H02J 7/0013; H02J 7/0048
USPC .................. 439/660, 504; 320/107
See application file for complete search history.

(56) References Cited

U.S. PATENT DOCUMENTS

| | | | |
|---|---|---|---|
| 7,918,685 B1 * | 4/2011 | Kruckenberg | H01B 11/00 174/75 C |
| 8,506,322 B2 * | 8/2013 | Spare | H01M 50/298 439/500 |
| 8,901,877 B2 * | 12/2014 | Brockman | H02J 7/0042 320/105 |
| 10,135,268 B1 * | 11/2018 | Gokcebay | H02J 7/0013 |
| 10,916,954 B1 * | 2/2021 | Sheriff | G06F 1/1635 |
| 2003/0017727 A1 * | 1/2003 | Seo | H05K 7/026 439/76.2 |
| 2010/0300927 A1 * | 12/2010 | Ouimette | H02J 7/0042 206/702 |
| 2012/0214332 A1 * | 8/2012 | Han | H01R 13/6666 439/504 |
| 2016/0365690 A1 * | 12/2016 | Ortiz | H01R 13/72 |
| 2018/0145469 A1 * | 5/2018 | Chung | H01R 31/065 |
| 2018/0254642 A1 * | 9/2018 | Corrie | H02J 7/0042 |
| 2019/0067966 A1 * | 2/2019 | Zhang | H02J 7/00 |
| 2019/0117989 A1 * | 4/2019 | Andrews | H02J 7/00 |
| 2020/0014226 A1 * | 1/2020 | Hemesath | H02J 7/0042 |
| 2020/0350735 A1 * | 11/2020 | Huang | H01R 13/02 |
| 2021/0075237 A1 * | 3/2021 | Myung | H02J 7/0048 |

(Continued)

OTHER PUBLICATIONS

EP1845590 orig. w/translation (Year: 2007).*

*Primary Examiner* — Marcus E Harcum
(74) *Attorney, Agent, or Firm* — Burbage Law, P.C.; Jon-Michael Burbage

(57) ABSTRACT

The specification describes cable comprising: a first universal serial bus (USB) connector, a first non-circular section cable coupled to the first USB connector, the first non-circular section cable having a cross-sectional width and a thickness, the cross-sectional width being substantially greater than the thickness, a splitter block coupled to the first non-circular section cable, two or more second non-circular section cables coupled to the splitter block, and two or more second USB connectors that are correspondingly coupled to the two or more second non-circular section cables. The first non-circular section cable may include a cable core comprising one or more signal conductors and an outer sleeve surrounding the cable core.

15 Claims, 12 Drawing Sheets

(56) References Cited

U.S. PATENT DOCUMENTS

| | | | |
|---|---|---|---|
| 2022/0096819 A1* | 3/2022 | Wasserman | A61N 1/36002 |
| 2023/0119496 A1* | 4/2023 | Myung | H02J 7/00047 |
| | | | 320/107 |

* cited by examiner

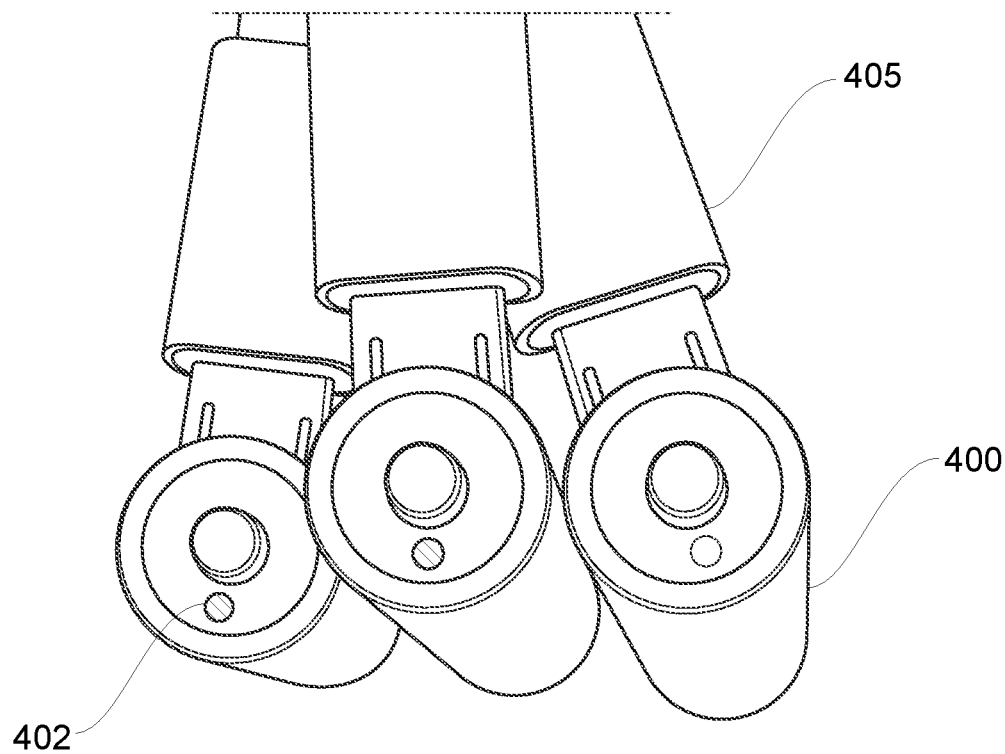
FIG 4A
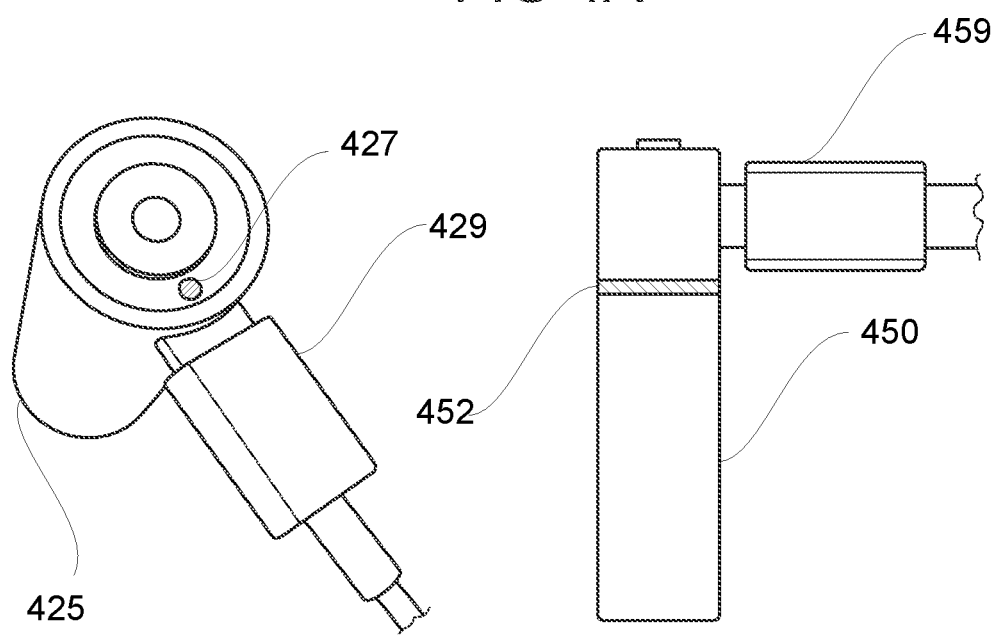
FIG 4B
FIG 4C

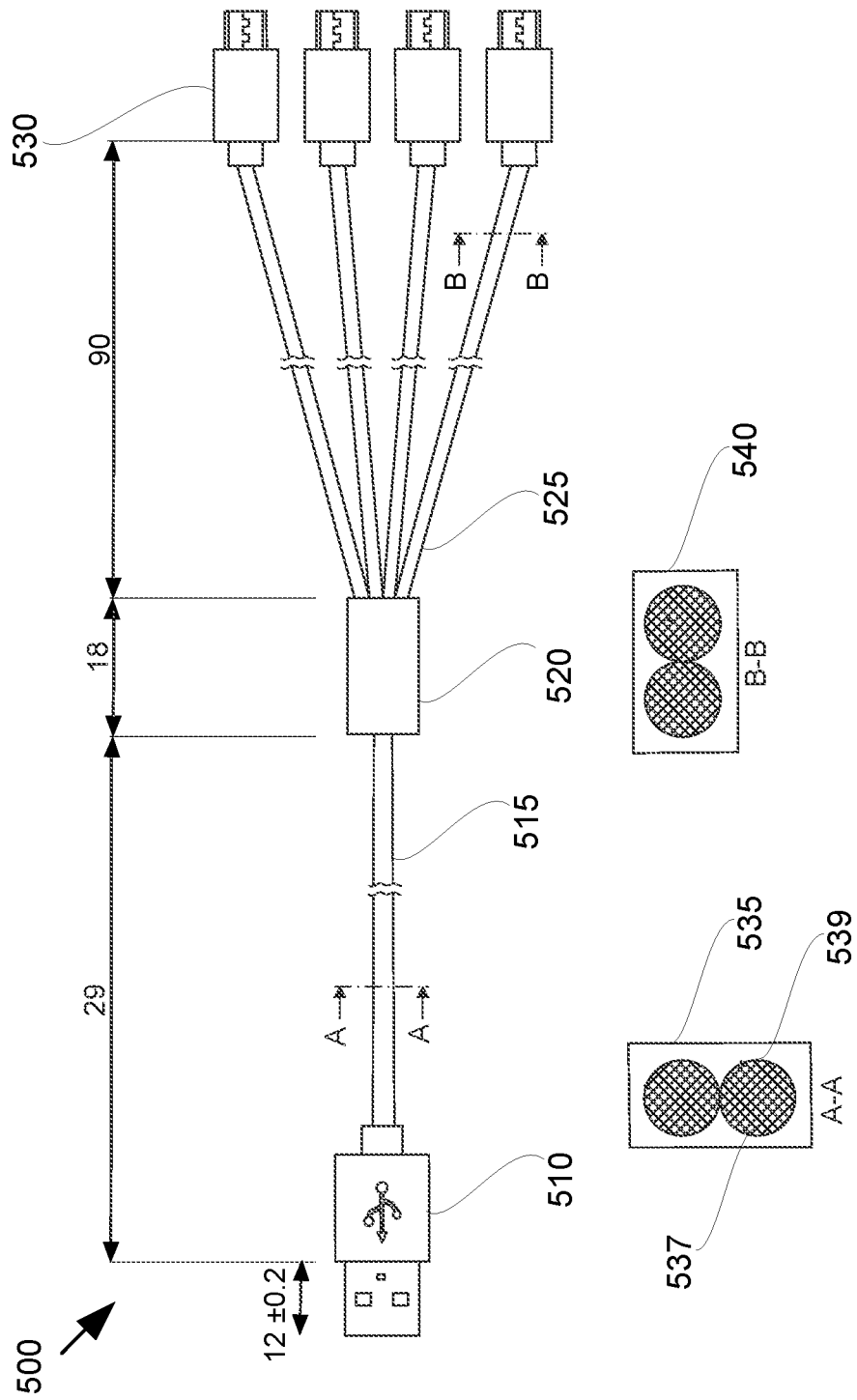

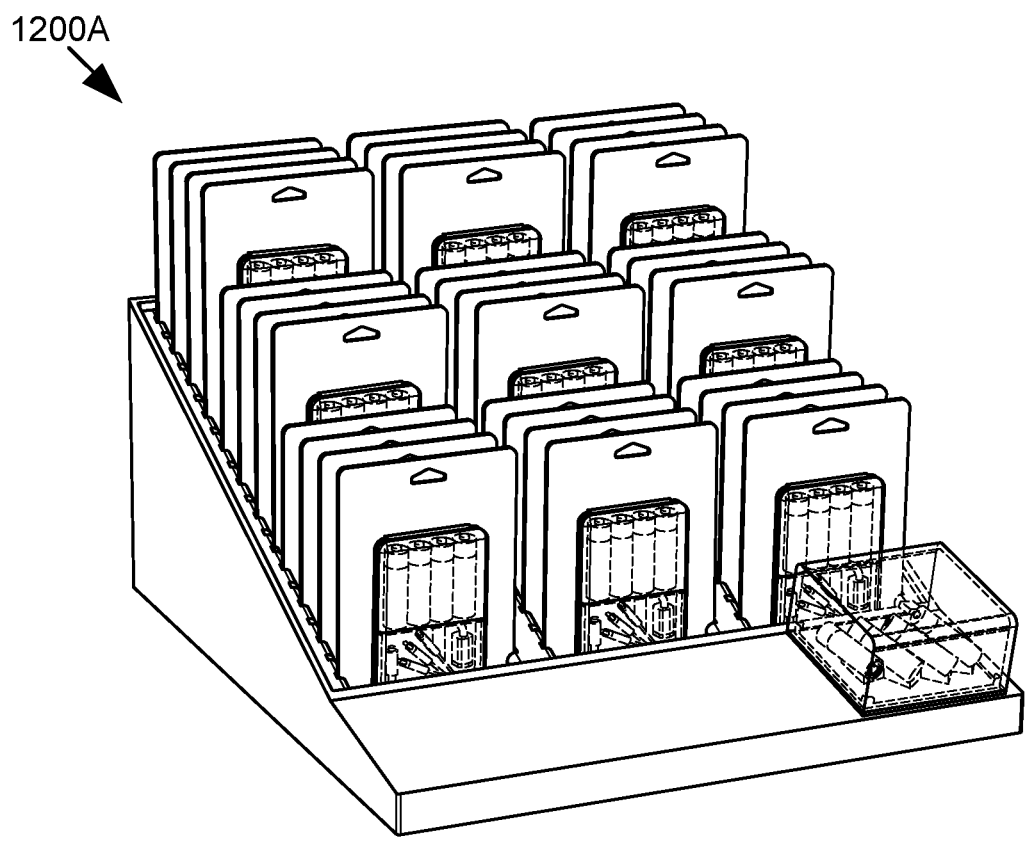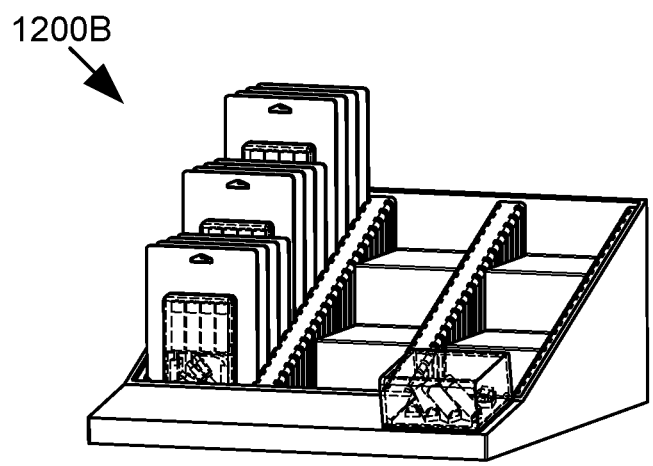
FIG 12

BATTERY CHARGING CABLE ASSEMBLY

FIELD

The described embodiments relate generally to a battery charging cable assembly.

BACKGROUND

An electrical cable generally includes one or more conductive wires that can be used to transmit power and/or data between devices connected to the two ends of the cable. The cable is wrapped in an outer sleeve that provides electrical insulation and protection.

The electrical cable is connected to the item to be charged, such as a mobile device, and a charging cube or other hardware that provides electricity to the item to be charged. Electric cables can be so short that they are difficult to manipulate or so long that they get tangled.

SUMMARY

In some embodiments, a cable comprises: a first universal serial bus (USB) connector, a first non-circular section cable coupled to the first USB connector, the first non-circular section cable having a cross-sectional width and a thickness, the cross-sectional width being substantially greater than the thickness, a splitter block coupled to the first non-circular section cable, two or more second non-circular section cables coupled to the splitter block, and two or more second USB connectors that are correspondingly coupled to the two or more second non-circular section cables. The first non-circular section cable may include a cable core comprising one or more signal conductors and an outer sleeve surrounding the cable core.

In some embodiments, the cable further includes two or more rechargeable batteries that each include micro-USB charging ports or USB-C charging ports. In some embodiments, the two or more rechargeable batteries each further include a state of charge (SOC) indicator that changes color to indicate a change in a charge of at least one of the two or more rechargeable batteries. In some embodiments, the SOC indicator is located on top of the at least one of the two or more rechargeable batteries or on a side of the one of the two or more rechargeable batteries. In some embodiments, the two or more rechargeable batteries are one or more of a AA battery, a AAA battery, a camera battery, or a lithium-ion rechargeable battery. In some embodiments, the first non-circular section cable has a length of 25-45 mm. In some embodiments, the first non-circular section cable has a length of 29 mm. In some embodiments, the two or more second non-circular section cables have a length of between 50-100 mm. In some embodiments, the two or more second non-circular section cables have a length of 90 mm. In some embodiments, wherein the two or more second non-circular section cables includes four second non-circular section cables. In some embodiments, the first USB connector is a USB-A connector. In some embodiments, the two or more second USB connectors are micro-USB connectors. In some embodiments, the two or more second USB connectors are USB-C connectors. In some embodiments, the splitter block has a length of between 15 and 25 mm. In some embodiments, a length of the splitter block is 18 mm. In some embodiments, the outer sleeve is a thermoplastic elastomer (TPE). In some embodiments, the TPE is selected from the group consisting of styrene ethylbutylene styrene (SEBS), styrene-butadiene-styrene (SBS), SEBS/SBS, thermoplastic olefins (TPO), thermoplastic vulcanizates (TPV), thermoplastic polyurethane (TPU), and thermoplastic polyester elastomer (TPEE).

The specification describes multiple advantages. A first advantage is that the battery cord is long enough to comfortably attach to the batteries, but not so long that it gets tangled. A second advantage is that the splitter block allows for multiple section B cords to be used to charge all the rechargeable batteries at the same time. A third advantage is that the section B cords are long enough for each manipulation and short enough to minimize tangling. A fourth advantage is that the cables being non-circular allows for structural rigidity without the risk of tangling.

BRIEF DESCRIPTION OF THE DRAWING

The disclosure is illustrated by way of example, and not by way of limitation in the figures of the accompanying drawings in which like reference numerals are used to refer to similar elements.

FIGS. 4A-C illustrates examples of batteries attached to the battery charging cable, according to some embodiments.

FIG. 5 illustrates an electrical configuration diagram of a battery charging cable with four cords, according to some embodiments.

FIG. 12 illustrates cases with multiple batteries and the battery charging cable inside package cards, according to some embodiments.

DETAILED DESCRIPTION

Charging cables can be used in a variety of applications. Examples include power and/or data transfer cables for consumer electronic devices. In some embodiments, a charging cable can be used to charge rechargeable batteries.

Figure 1:
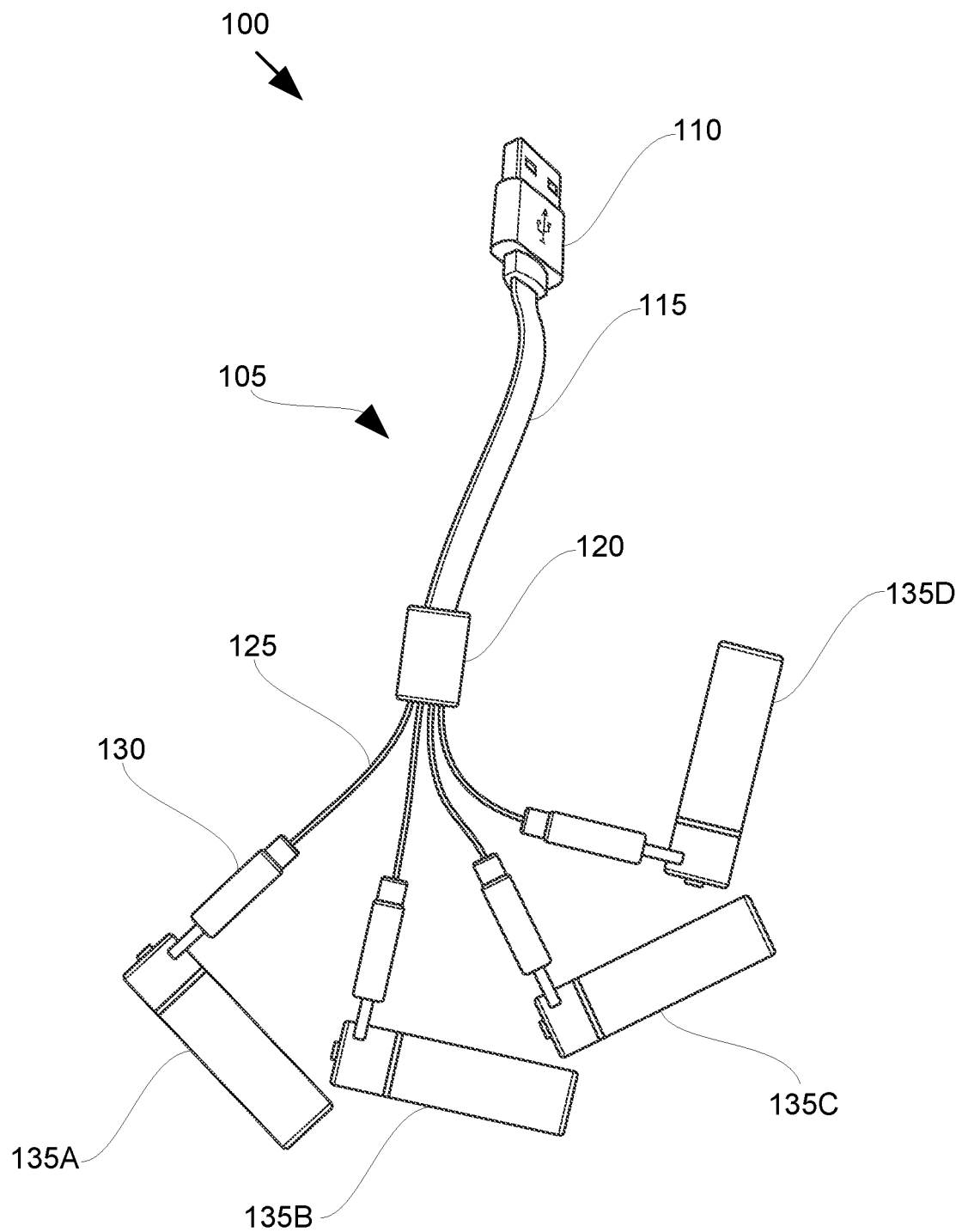
FIG. 1 illustrates a top-down view of the battery charging cable assembly, according to some embodiments.

FIG. 1 illustrates a top-down view of the battery charging cable assembly 100. The battery charging cable assembly 100 includes a charging cable 105 and rechargeable batteries 135A, B, C, N. The charging cable 105 includes a first universal serial bus (USB) connector 110, a section A cable 115, a splitter block 120, section B cables 125, and second USB connectors 130. The electrical connection of the battery charging cable assembly 100 may be accomplished by techniques known to those of ordinary skill in the art, such as direct contact, electrical soldering of cable sections, etc.

The second USB connectors 130 are attached to each of the rechargeable batteries 135A, B, C, N. In FIG. 1 and the remaining figures, a letter after a reference number, e.g., "135A," represents a reference to the element having that particular reference number. A reference number in the text without a following letter, e.g., "135," represents a general reference to embodiments of the element bearing that reference number.

In some embodiments, the first USB connector 110 is a USB-A connector that can be attached to a USB-A receptacle in a charging cube that includes a power plug, attached to a laptop, a power bank, etc. In other embodiments, the first USB connector 110 is a USB-C connector that can be attached to a USB-C receptable in hardware that provides power to the charging cable 105. In some embodiments, the first USB connector 110 is one of the following connectors: 1.1-2.0, 3.0, type A, type B, type C, mini A, mini B, micro A, micro B, micro B super speed, etc.

The section A cable 115 (also referred to as a first cable in the description and the claims) is a non-circular cable. In some embodiments, the non-circular cable is oblong or has a substantially flat cross-section. The section A cable 115 may have a cross-sectional width and a thickness, where the cross-sectional width is substantially greater than the thickness. In some embodiments, the section A cable 115 has a width of 5-10 millimeters (mm) and a thickness of 1-3 mm. In some embodiments, the section A cable 115 has a length that is long enough to be convenient, but not so long that it gets tangled. The section A cable 115 may have a length between 25-45 mm. In some embodiments, the section A cable 115 preferably has a length of 29 mm±3 mm. In some embodiments, the section A cable 115 preferably has a length of 35 mm.

The splitter block 120 facilitates splitting of the single section A cable 115 into multiple second B cables 125. In some embodiments, the splitter block 120 expands the single section A cable 115 into two section B cables 125. In this example, the splitter block 120 expands the single section A cable 115 into four section B cables 125. The splitter block 120 may be substantially flat, spherical, etc. The splitter block 120 may have a length between 15-25 mm. In some embodiments, the splitter block 120 is 18 mm.

The section B cable 125 (also referred to as a second cable in the description and the claims) is a non-circular cable. The section B cable 125 may have a length between 50-95 mm. In some embodiments, the section B cable 125 preferably has a length of 90 mm. In this example, the charging cable 105 includes four section B cables 125. In some embodiments, the charging cable 105 includes two section B cables 125. Other numbers of section B cables 125 are possible.

Each section B cable 125 is associated with a second USB connector 130. In some embodiments, the second USB connector 130 is a micro-USB connector or a USB-C connector. In other embodiments, the second USB connector 130 is a USB-C connector. In some embodiments, the second USB connector 130 is one of the following connectors: 1.1-2.0, 3.0, type A, type B, type C, mini A, mini B, micro A, micro B, micro B super speed, etc.

The rechargeable batteries 135A, B, C, N each include a port that connects to the second USB connector 130 for charging. The port may be compatible with the following connectors: 1.1-2.0, 3.0, type A, type B, type C, mini A, mini B, micro A, micro B, micro B super speed, etc. In some embodiments, the rechargeable batteries 135 each include a micro-USB charging port or a USB-C charging port. The rechargeable batteries 135 may be AA batteries; AAA batteries; camera batteries, such as CR123, CR2, 2CR5, CR-P2, CR-V3, CP1, 7R31; lithium-ion rechargeable batteries, such as 18650; or any combination thereof. For example, the rechargeable batteries 135 may be lithium-ion rechargeable AAA batteries.

Figure 2:
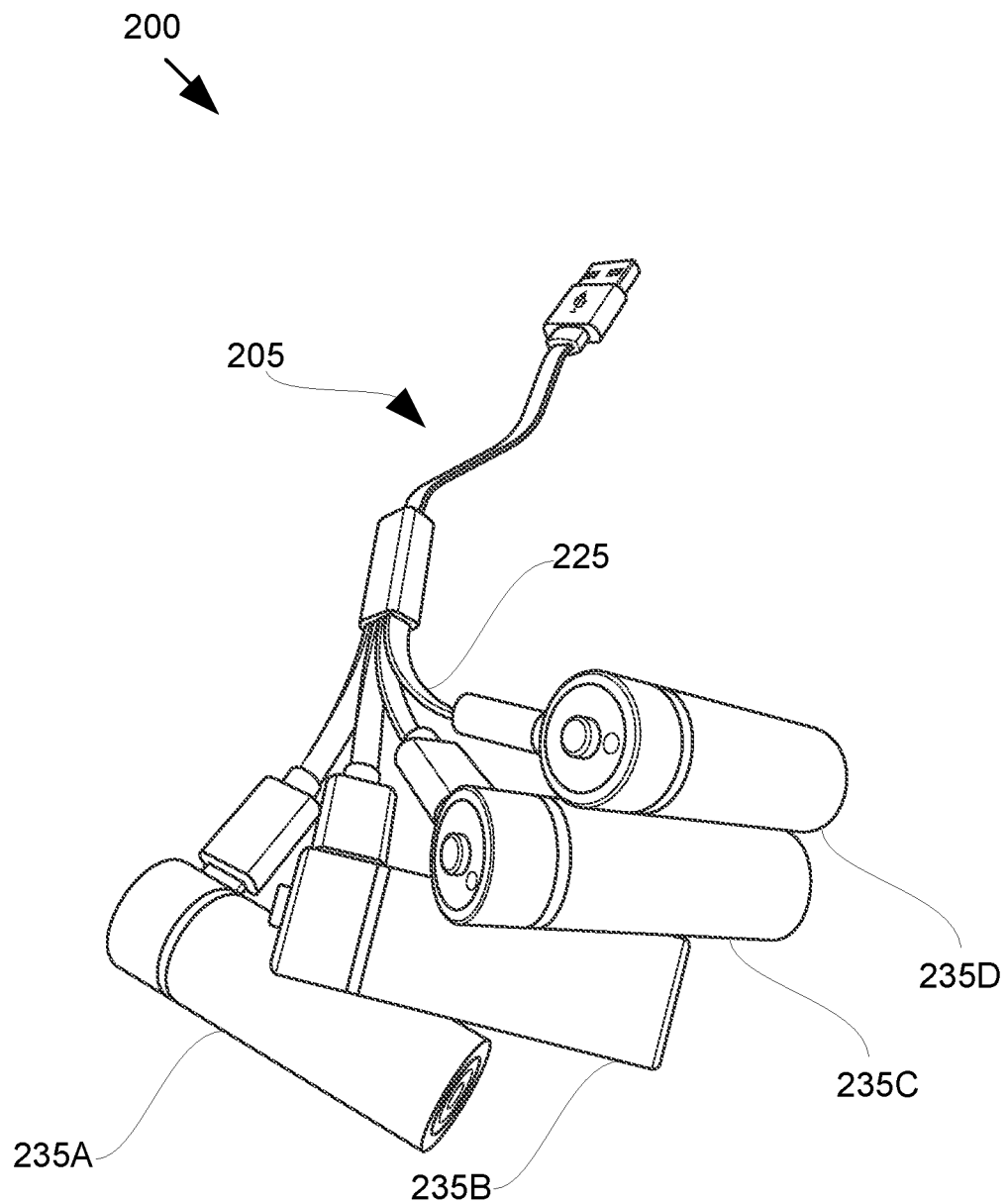
FIG. 2 illustrates a profile view of the battery charging cable assembly with AA batteries, according to some embodiments.

FIG. 2 illustrates a profile view 200 of the battery charging cable assembly 205 with AA batteries, according to some embodiments. The section B cables 225 are designed to be short enough that the cables do not get tangled, but not so short that it is difficult to attach the section B cables 225 to the rechargeable batteries 235.

Figure 3:
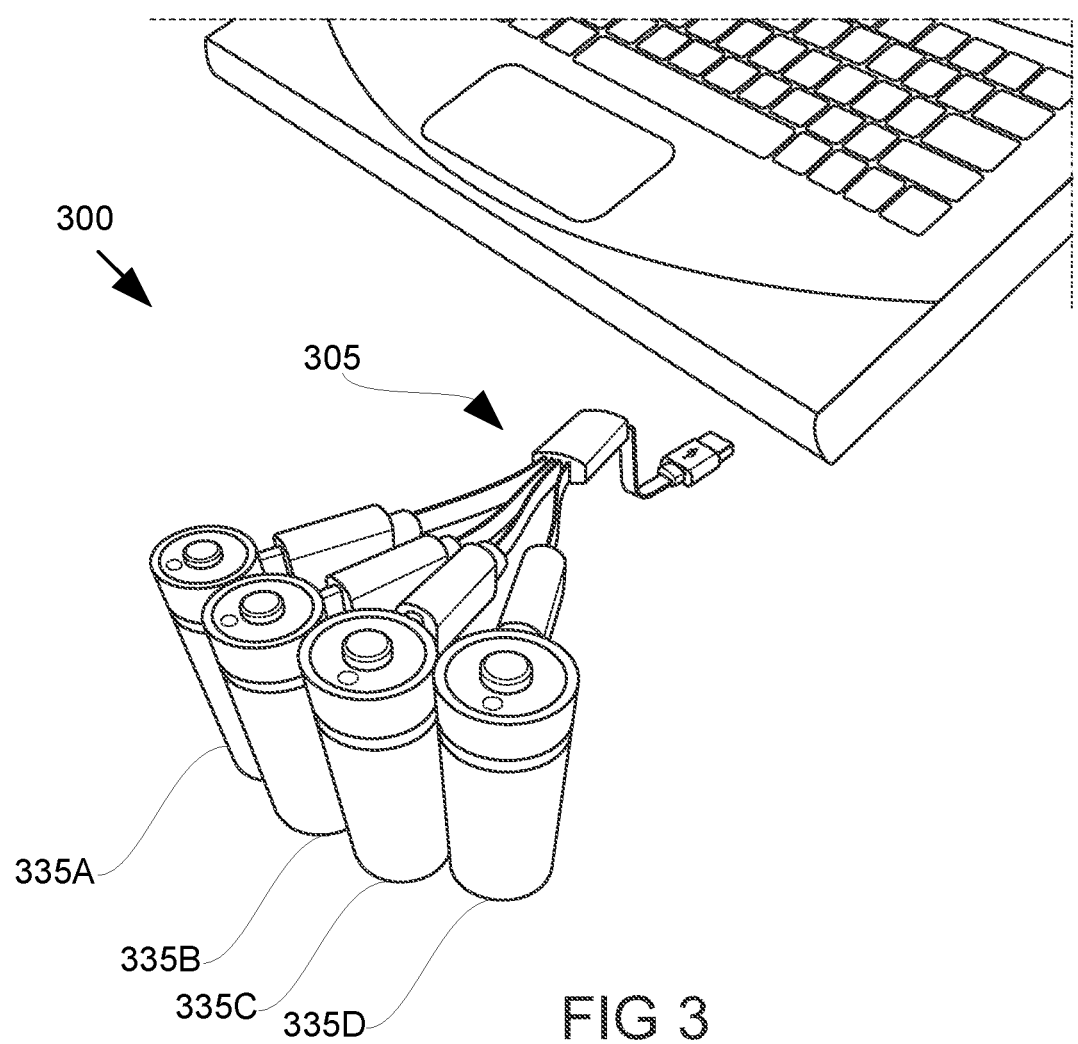
FIG. 3 illustrates a profile view of the battery charging cable assembly with lithium-ion batteries, according to some embodiments.

FIG. 3 illustrates a profile 300 view of the battery charging cable assembly 305 with lithium-ion batteries 335, according to some embodiments. FIG. 3 illustrates that the lengths of the section A cable 315 and the section B cables 325 allow the lithium-ion batteries 335 to be attached without crowding of the batteries. The section A cable 315 is long enough to comfortably attach the battery charging cable assembly 305 to a laptop.

FIGS. 4A-C illustrates examples of batteries attached to the battery charging cable, according to some embodiments.

FIG. 4A illustrates rechargeable batteries 400 with state of charge (SOC) indicators 402 on the top of the rechargeable batteries 400. The SOC indicators 402 are small circles that light up to indicate the charge. In this example, the SOC indicators 402 are green when the rechargeable batteries have a charge and have no color if the rechargeable batteries 400 are not fully charged. In another example, the SOC indicators 402 may be green if the charge exceeds a threshold value. In another example, the SOC indicators 402 have no color if the charge falls below a predetermined threshold value. In yet another example, the SOC indicators 402 have no color if there is a 0% charge. Other options are possible, such as multiple colors that display different levels of charges or colors other than green and red that indicate the SOC. The rechargeable batteries 400 are attached to second USB connectors 405.

FIG. 4B illustrates a rechargeable battery 425 with a SOC indicator 427 on the top of the rechargeable battery 425. In this example, the SOC indicator 427 changes to red when the battery 425 is uncharged or the charge falls below a predetermined threshold percentage, but other colors and configurations of charge percentage are possible. The rechargeable battery 425 is attached to a second USB connector 429.

FIG. 4C illustrates a rechargeable battery 450 with a SOC indicator 452. In this example, the SOC indicator 452 is located on the side of the rechargeable battery as a circumference of the rechargeable battery 450. In this example, the SOC indicator 452 is green when the battery is charged or the charge exceeds a predetermined percentage of charge. Alternatively, the SOC indicator 452 could be on the side of the battery, but at one point similar to the circle illustrated in FIG. 4A. The rechargeable battery 450 is attached to a second USB connector 459.

FIG. 5 illustrates an electrical configuration diagram of a battery charging cable 500 with four cords, according to some embodiments. The charging cable 500 includes a first USB connector 510, a section A cable 515, a splitter block 520, section B cables 525, and second USB connectors 530. In this example, the first USB connector 510 is a USB-A connector. In this example, the first USB connector 510 has a length of 12±0.2 mm, the section A cable 515 has a length of 29 mm±3 mm, the splitter block 520 has a length of 18 mm, and the section B cables 525 have a length of 90 mm. The length of the section B cable 525 could be different, such as 50 mm. In some embodiments, each section B cable 525 may have a different length.

The section A cable 515 and the section B cable 525 each include a cable core 537 comprising one or more signal conductors and an outer sleeve 539 surrounding the cable core 537.

The cable core may include conductive wires that are insulted from each other. The conductive wires can be made of different materials, such as copper, and have any gauge desired. Any number of wires can be included. The cable core 537 provides wires with the ability to conduct power, ground, and provide differential data signals. The cable core 537 may include one or more optical fibers or other optical signal conductors in addition to or instead of electrically conductive wires or other electrical signal conductors.

In some embodiments, the outer sleeve 539 is made from a thermoplastic elastomer (TPE). More specifically, the TPE can be selected from the group consisting of styrene ethylbutylene styrene (SEBS), styrene-butadiene-styrene (SBS), SEBS/SBS, thermoplastic olefins (TPO), thermoplastic vulcanizates (TPV), thermoplastic polyurethane (TPU), and thermoplastic polyester elastomer (TPEE).

The cross section 535 of the section A cable 515 may provide structural rigidity to the section A cable 515. In some embodiments, the cross section 535 of the section A cable 515 includes two internal conductors where the wires are internally insulated from each other. The cables may be side by side and the wire thickness in the section A cable 515 is thicker than the section B cables 525. In some embodiments, the cross section 535 uses 0.08 mm wire, such as fine annealed copper wire.

Once the splitter block 520 divides up the section A cable 515 into four section B cables 525, each of the section B cables 525 has two internal conductors, but with fewer wires. In some embodiments, the battery charging cable 500 is a 300 volt (V) direct current (DC) power cable with an insulation resistance of between 3M-10M ohms.

Figure 6:
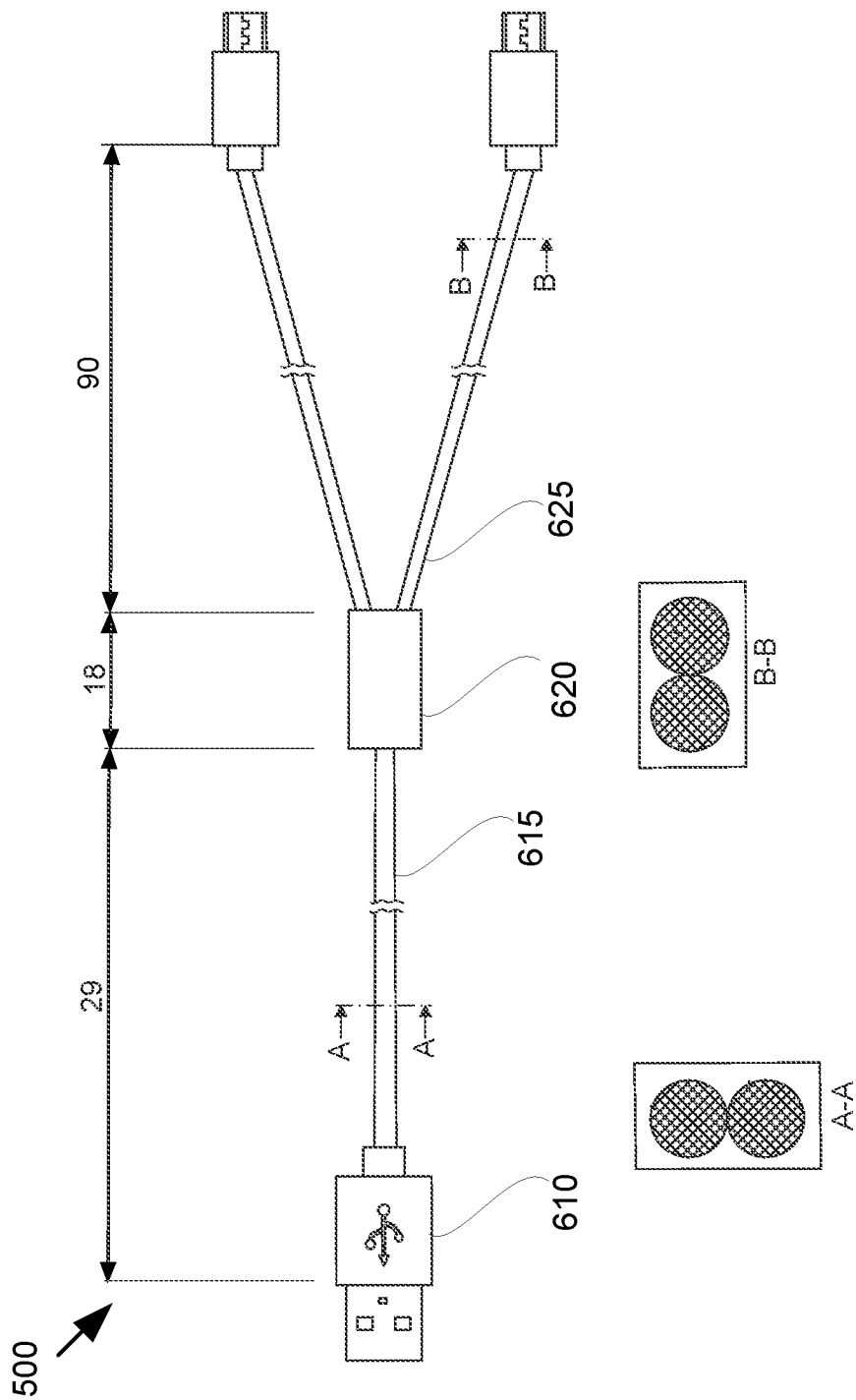
FIG. 6 illustrates an electrical configuration diagram of a battery charging cable with two cords, according to some embodiments.

FIG. 6 illustrates an electrical configuration diagram of a battery charging cable 600 with two cords, according to some embodiments. The charging cable 600 includes a first USB connector 610, a section A cable 615, a splitter block 620, section B cables 625, and second USB connectors 630. In this example, the first USB connector 510 is a USB-A connector. In this example, the first USB connector 610 has a length of 12±0.2 mm, the section A cable 615 has a length of 29 mm±3 mm, the splitter block 620 has a length of 18 mm, and the section B cables 625 have a length of 90 mm.

The cross section 635 of the section A cable 615 illustrates that the cable is a twisted pair cable that uses 0.08 mm wire, such as fine annealed copy wire. Once the splitter block 620 divides up the section A cable 615 into two section B cables 625, each of the section B cables 625 has a twisted pair cable, but with fewer wires. In some embodiments, each section B cable 625 has a different length. In some embodiments, the battery charging cable 600 is a 300 V DC power cable with an insulation resistance of between 3M-10M ohms.

Figure 7:
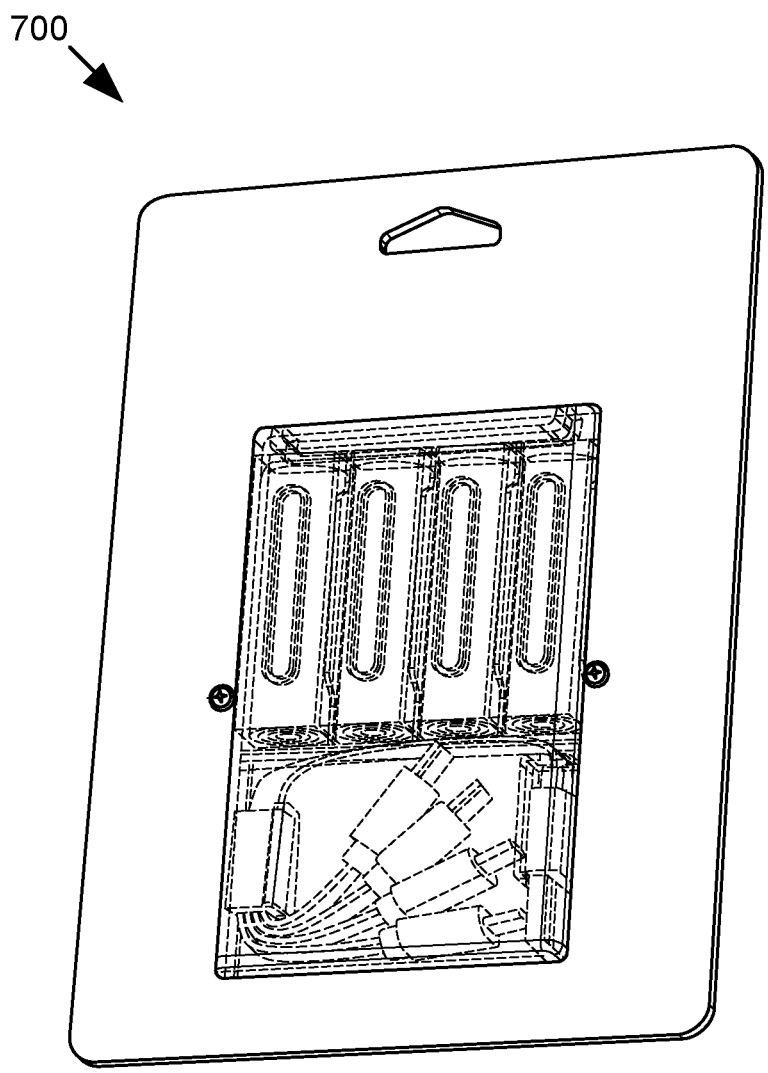
FIG. 7 illustrates a front view of the batteries and battery charging cable inside a package card, according to some embodiments.

FIG. 7 illustrates a front view a package card 700 that includes the rechargeable batteries and battery charging cable, according to some embodiments. In this example, the rechargeable batteries and charging cords are illustrated with dashed lines since different types of batteries and different length charging cords could be used. In some embodiments, the package card 700 is 2.5 mm thick cardstock, with paper that is laminated on both sides. The package card 700 is attached to a battery case with two screws that attach on the back side of the package card 700 to secure the battery case to the package card 700.

Figure 8:
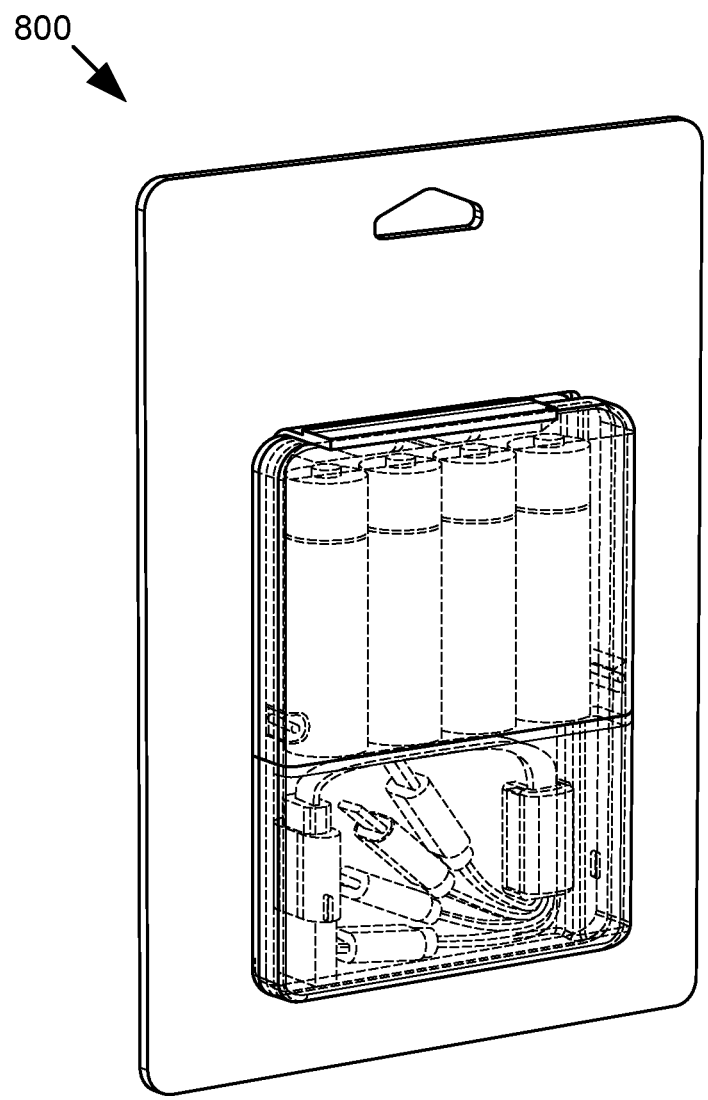
FIG. 8 illustrates a back view of the package card, according to some embodiments.

FIG. 8 illustrates a back view of the package card 800, according to some embodiments. The screws illustrated in FIG. 7 attach to the plastic case that holds the rechargeable batteries and the battery charging cable. The back of the aperture for the screws is visible in FIG. 8.

Figure 9:
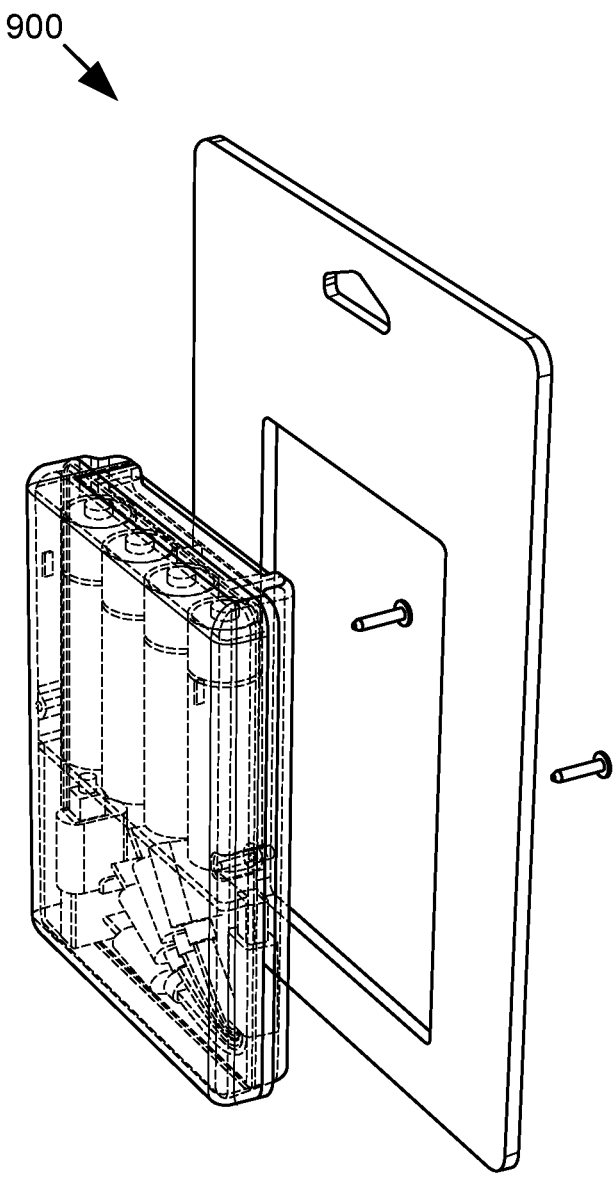
FIG. 9 illustrates an exploded side view of the batteries and battery charging cable inside a package card, according to some embodiments.

FIG. 9 illustrates an exploded view of the batteries inside a package card 900, according to some embodiments. This example illustrates where the screws fit into the plastic case in order to secure the rechargeable batteries and the battery charging cable inside the package card 600.

Figure 10:
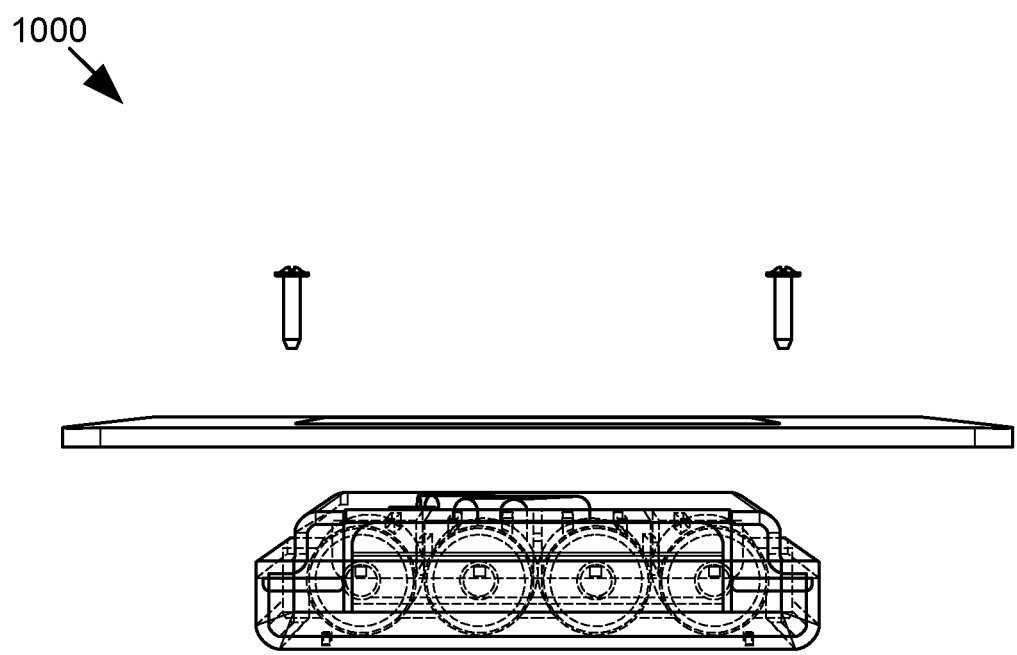
FIG. 10 illustrates an exploded top-down view of batteries and battery charging cable inside a package card, according to some embodiments.

FIG. 10 illustrates an exploded top-down view of batteries inside a package card 1000, according to some embodiments.

Figure 11:
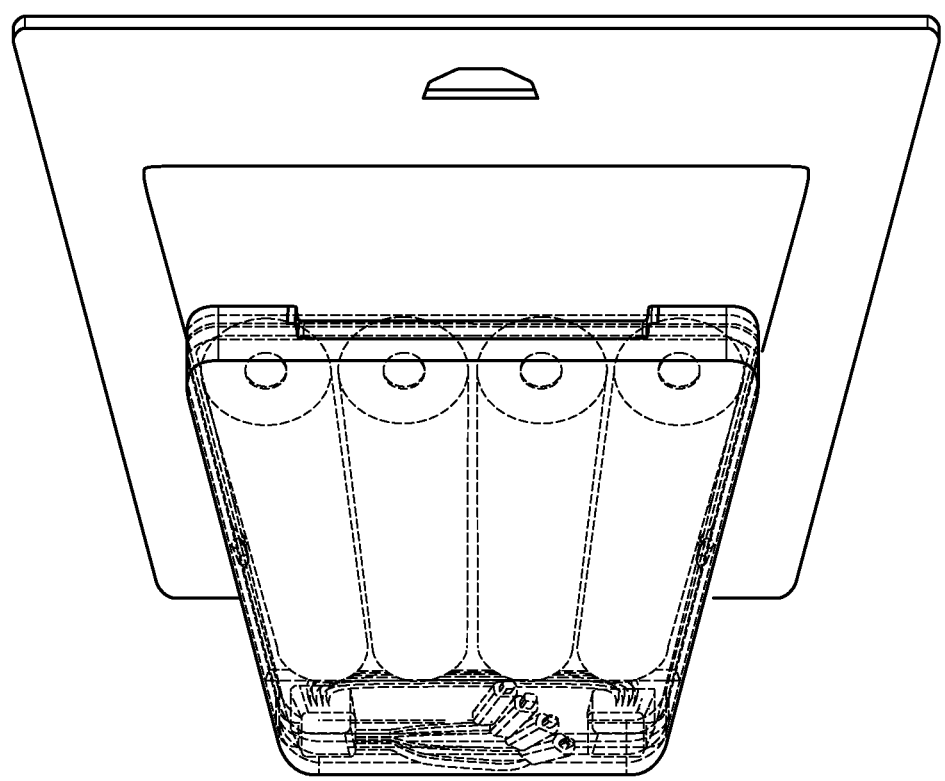
FIG. 11 illustrates a top view of the batteries and battery charging cable inside a package card, according to some embodiments.

FIG. 11 illustrates a top view of the batteries inside a package card 1100, according to some embodiments.

FIG. 12 illustrates cases 1200A, 1200B with multiple batteries inside package cards, according to some embodiments. The cases 1200A, 1200B include a transparent box with the rechargeable batteries to allow for more thorough inspection of the batteries.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

All structural and functional equivalents to and combinations of the elements of the above-described preferred embodiment and additional embodiments that are known to those of ordinary skill in the art are hereby expressly incorporated by reference and are intended to be encompassed by the claims. However, it should be readily apparent to those of ordinary skill in the art that various changes and modifications in form, apparatus material, and fabrication material detail may be made without departing from the spirit and scope of the claims.

Moreover, no requirement exists for a device or method to address each and every problem sought to be resolved by the claims. Furthermore, no element, component, or method step in the present disclosure is intended to be dedicated to the public regardless of whether the element, component, or method step is explicitly recited in the claims.

What is claimed is:

1. A cable comprising:
    a first universal serial bus (USB) connector;
    a first non-circular section cable coupled to the first USB connector, the first non-circular section cable having a cross-sectional width and a thickness, the cross-sectional width being substantially greater than the thickness, the first non-circular section cable including:
        a cable core comprising one or more signal conductors; and
        an outer sleeve surrounding the cable core;
    a splitter block coupled to the first non-circular section cable;
    two or more second non-circular section cables coupled to the splitter block; and
    two or more second USB connectors that are correspondingly coupled to the two or more second non-circular section cables; and
    two or more rechargeable batteries that each include micro-USB charging ports or USB-C charging ports, wherein the two or more rechargeable batteries each further include a state of charge (SOC) indicator that changes color to indicate a change in a charge of at least one of the two or more rechargeable batteries.

2. The cable of claim 1, wherein the SOC indicator is located on top of the at least one of the two or more rechargeable batteries or on a side of the one of the two or more rechargeable batteries.

3. The cable of claim 1, wherein the two or more rechargeable batteries are one or more of a AA battery, a AAA battery, a camera battery, or a lithium-ion rechargeable battery.

4. The cable of claim 1, wherein the first non-circular section cable has a length of between 25-45 mm.

5. The cable of claim 1, wherein the first non-circular section cable has a length of 29 mm.

6. The cable of claim 1, wherein the two or more second non-circular section cables have a length of between 50-100 mm.

7. The cable of claim 1, wherein the two or more second non-circular section cables have a length of 90 mm.

8. The cable of claim 1, wherein the two or more second non-circular section cables includes four second non-circular section cables.

9. The cable of claim 1, wherein the first USB connector is a USB-A connector.

10. The cable of claim 1, wherein the two or more second USB connectors are micro-USB connectors.

11. The cable of claim 1, wherein the two or more second USB connectors are USB-C connectors.

12. The cable of claim 1, wherein the splitter block has a length of between 15 and 25 mm.

13. The cable of claim 1, wherein a length of the splitter block is 18 mm.

14. The cable of claim 1, wherein the outer sleeve is a thermoplastic elastomer (TPE).

15. The cable of claim 14, wherein the TPE is selected from the group consisting of styrene ethylbutylene styrene (SEBS), styrene-butadiene-styrene (SBS), SEBS/SBS, thermoplastic olefins (TPO), thermoplastic vulcanizates (TPV), thermoplastic polyurethane (TPU), and thermoplastic polyester elastomer (TPEE).

* * * * *